United States Patent
Lamson

[19]

[11] Patent Number: 6,164,949
[45] Date of Patent: Dec. 26, 2000

[54] ADJUSTABLE CURLING SCREW MECHANISM FOR A LIP ROLLING MACHINE

[75] Inventor: Wayne W. Lamson, Beaverton, Mich.

[73] Assignee: Brown Machine, LLC., Beaverton, Mich.

[21] Appl. No.: 09/203,896

[22] Filed: Dec. 2, 1998

[51] Int. Cl.[7] .................................................. B29C 53/84
[52] U.S. Cl. ........................ 425/329; 425/392; 425/384; 264/297.4; 264/297.8
[58] Field of Search ................................. 425/391, 392, 425/329, 384, 182, 188; 264/296, 297.4, 297.8

[56] References Cited

U.S. PATENT DOCUMENTS

| | | | |
|---|---|---|---|
| 3,363,283 | 1/1968 | Weber | 425/329 |
| 3,579,737 | 5/1971 | Gerber et al. | 425/394 |
| 3,914,102 | 10/1975 | Brown | 425/392 |
| 3,920,373 | 11/1975 | Brown | 425/392 |
| 4,235,579 | 11/1980 | Kurz et al. | 425/174.4 |
| 4,391,768 | 7/1983 | Arends et al. | 425/391 |
| 5,118,277 | 6/1992 | Padovani | 425/384 |

*Primary Examiner*—Robert Davis
*Assistant Examiner*—Thukhanh T. Nguyen
*Attorney, Agent, or Firm*—John R. Benefiel

[57] ABSTRACT

A curling screw adjustment mechanism for changing the radial spacing of the curling screws of a lip curling machine forming a lip on a thermoformed plastic container such as a cup, in which the curling screws are each mounted on separate interlinked pivoted mounting plates which are moved in unison by adjustments of a threaded rod. The curling screws are also cooled by indirect contact with a cooling liquid circulated through separate aluminum arbors on which the stainless steel curling screws are mounted to allow changing the curling screws without spillage of coolant.

12 Claims, 9 Drawing Sheets

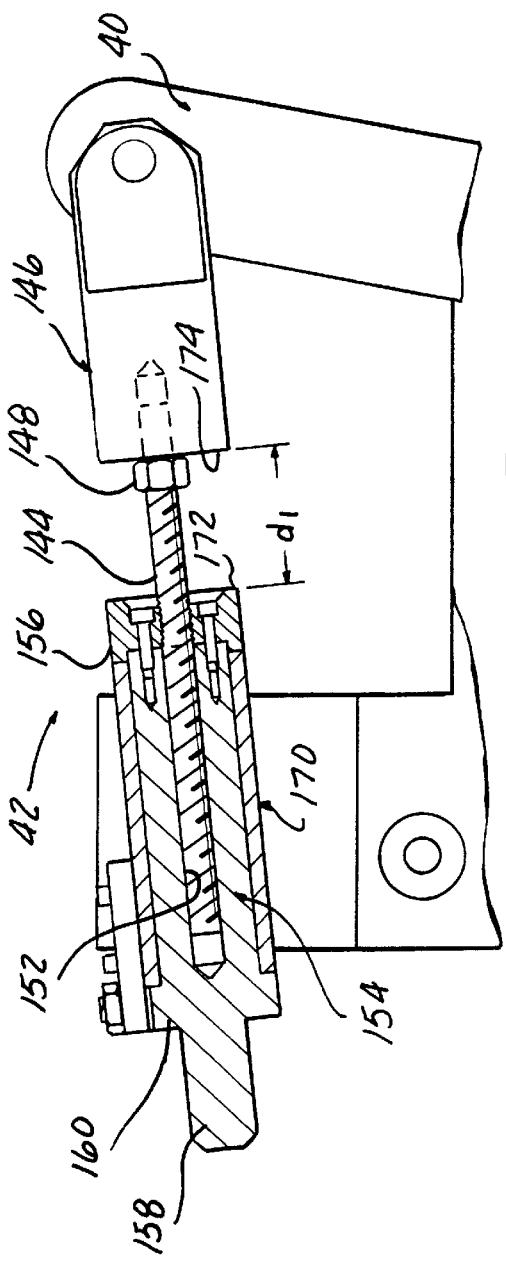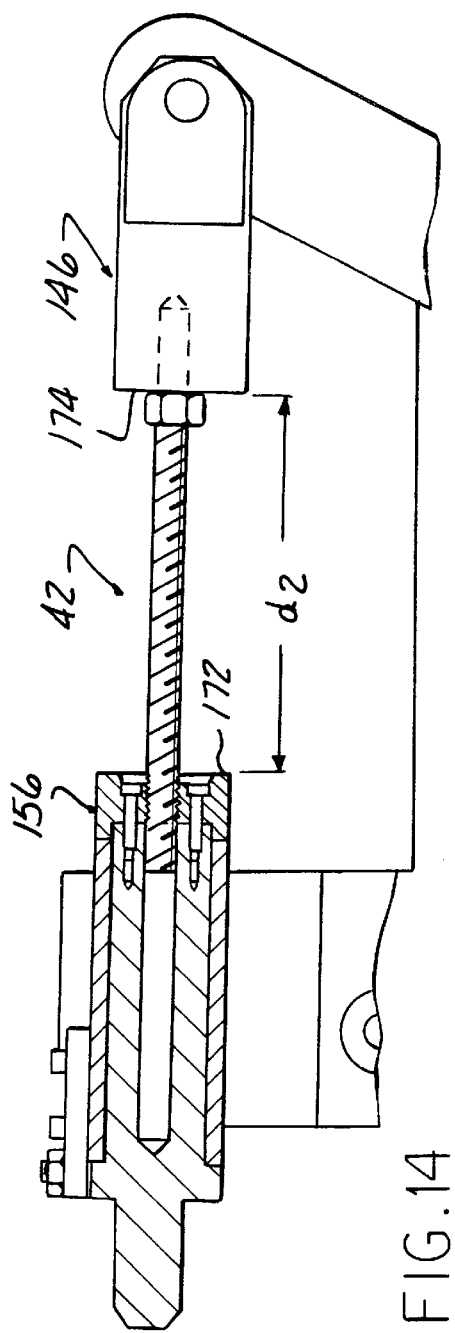

ADJUSTABLE CURLING SCREW MECHANISM FOR A LIP ROLLING MACHINE

BACKGROUND OF THE INVENTION

This invention concerns lip rolling or curling machines which are used to form a lip on the rim of thermoformed plastic containers such as disposable cups to provide a formed edge around the cup rim. Such machines have been known and used successfully for many years, as described in U.S. Pat. No. 3,337,919 issued on Aug. 29, 1967 for a "Container Rim Bending Apparatus". This type of machine includes a set of feed rollers which are arranged in a circular array with a stack of nested cups directed into the space between the feed rollers to be engaged by the rollers to rotate the stack and feed it forward at a predetermined rate through an oven and thence into a set of rotating curling screws.

The curling screws comprise a set of helically grooved rotary members, the grooved curling screws each configured to cooperate with the other curling screws in the set to roll form each cup rim as they drive each cup through the circular space between the curling rollers.

The spacing of curling screws is sometimes designed to be adjustable to be adapted to different cup sizes. The rotation of each of the curling screws must be accurately synchronized with each other in order to properly form the lip, and a timing belt drive is typically used to achieve this. Thus, any adjustment must not affect the timing belt engagement, or the synchronism must be carefully reset. In the past, each curling screw was mounted to be separately adjustably positioned along a radial line from the center of the spacing circle to be located either further in or further out to match the circular space to the particular cup size being processed. There are disadvantages to this individual adjustment, including the fact that considerable effort and time are required to position each individual curling screw accurately, requiring shut down of production while the adjustment is carried out. One or more of the curling screws are typically located in difficult to reach locations within the machine, which contributes to the difficulty and time required for an adjustment. A four curling screw machine is superior to one having three curling screws, as four curling screws are better able to exert compression on the cup rim during forming than three screws, since opposing curling screw pairs may thus be provided. However, the difficulties encountered in making set up adjustments on individual curling screws has resulting in most machines having only three curling screws.

Another important disadvantage is the fact that the center axis around which the curling screws are arranged is usually shifted somewhat during adjustments such that the center axis is not aligned with the center of the space between a set of guide rods used to guide the cup stack into the space between the curling screws. This discrepancy as well as other misalignments limits the speed at which cups can be fed through these adjustable machines.

The cups are heated in an oven mounted just ahead of the curling screws, to soften the cup rims preparatory for the lip rolling operation. Thus, the curling screws must be cooled to prevent being heated excessively by contact with the cups and to maintain a proper forming temperature of the cups so that the lips will be set after exiting the machine.

This cooling is usually carried out by the circulation of a cooling liquid such as water directly within each curling screw, as it has heretofore been thought necessary to have direct contact of the coolant with the curling screws to obtain adequate cooling. The disadvantage of this approach is that when the curling screws are replaced, as for processing a different family of container sizes, or when being serviced, the coolant leaks out, creating a mess to be cleaned up, making replacement a lengthy process.

It is the object of the present invention to provide an adjustable curling screw mechanism for a lip rolling machine which allows a quick, convenient, and simultaneous adjustment of the radial position of all of the curling screws in a manner which accurately maintains the location of the center axis around which the curling screws are arranged, and also does not interfere with the timing belt engagement.

It is a further object of the present invention to provide a coolant circulation path within the curling screws which precludes spillage of coolant when the curling screws are replaced.

SUMMARY OF THE INVENTION

The above objects are achieved by a pivotal plate mounting of all of the curling screws such as to constrain all of the curling screws to move radially in and out simultaneously and in an equal amount for each adjustment of a common adjuster. The center axis of the spacing thus cannot change as the movement in unison of the curling screws occurs, and the adjustment itself can be carried out quickly, and even while the machine is in operation. Specifically, a series of mounting plates are provided, on which a respective curling screw is rotatably mounted. The mounting plates are in turn each pivoted on a main support plate and connected together by series of links so as to all be pivoted simultaneously by an adjuster including a threaded adjusting rod, to swing all of the curling screws radially inwardly or outwardly an equal distance with respect to a fixed center axis.

Each pivotal mounting plate may also rotatably mount an idler and an individual drive pulley which drives a belt passed around a pulley mounted on the associated curling screw, and may also carry a belt tensioner arrangement allowing shifting of the idler pulley on the particular mounting plate.

A common drive belt circulates around all of the individual drive pulleys, which common drive belt is driven by a main drive pulley.

The common drive belt tension is maintained as all of the pivotal mounting plates are pivoted while making an adjustment of the curling screw spacing diameter.

The pivot axis for each mounting plate is aligned with the individual drive pulley on that plate so that no effect on the driven belt results from making any adjustments of the curling screw radial position.

The curling screws each comprise hollow cylinders closed at one end, which are each mounted on a respective aluminum arbor, relatively fit to be tightly fit together when the normal operating temperature is reached. The coolant is circulated within the arbor only so that no escape of coolant results when the curling screws are removed. The tight fit of the aluminum arbor creates sufficient heat transfer to the highly conductive arbor from the stainless steel curling screw that direct contact of the coolant is not required.

DESCRIPTION OF THE DRAWINGS

FIGS. 13 and 14 are partially sectional longitudinal of the adjuster shown in FIG. 12, in different adjusted positions.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
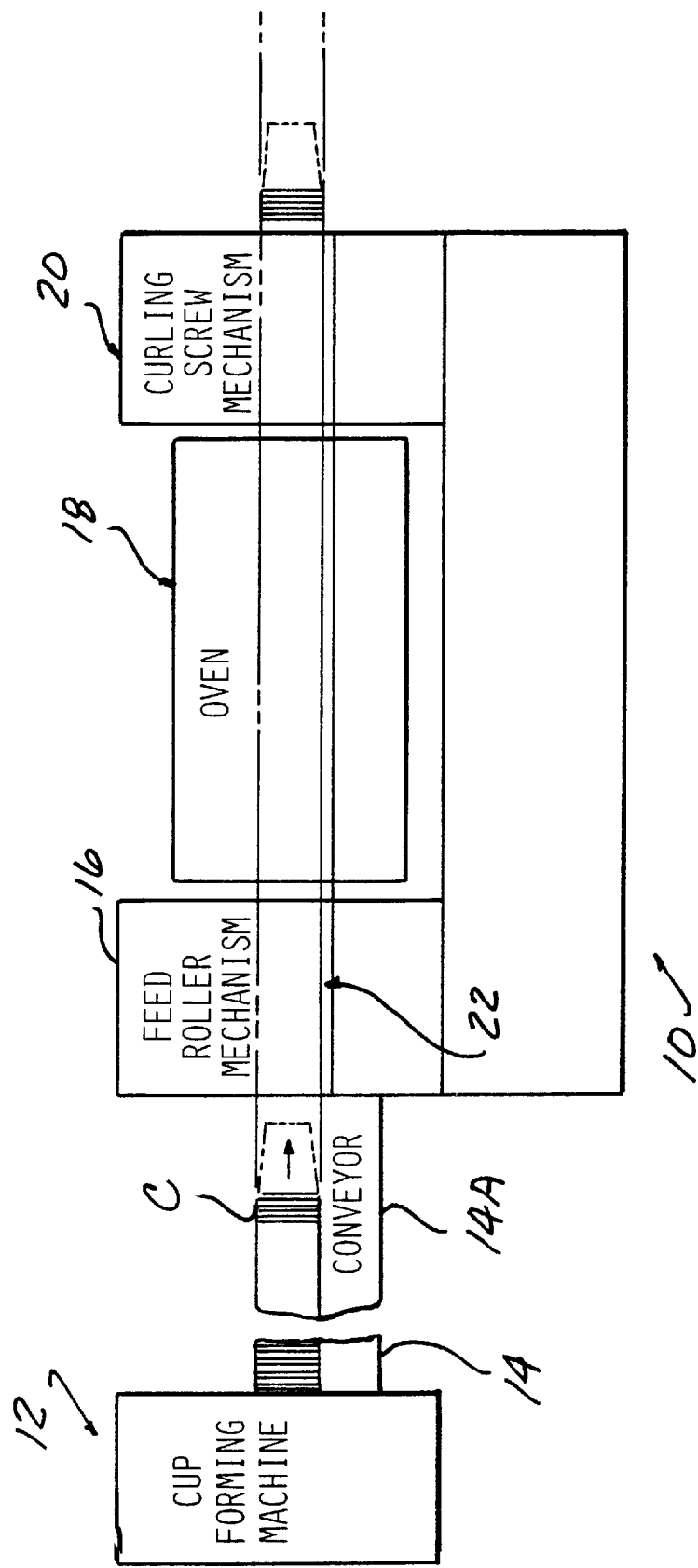
FIG. 1 is a simplified diagram of a lip rolling machine in which the adjustable curling screw mechanism is used.

Referring to the drawings, and particularly FIG. 1, a lip curling machine 10 (also referred to as a lip rolling machine) of the type shown in U.S. Pat. No. 3,337,919 is represented diagrammatically.

A train of nested cups C is conveyed from a cup forming machine 12. Typically, accumulating devices (not shown) may be used to insure a constant supply of nested cups to the lip curling machine 10 via a conveyor 14.

A transition conveyor 14A receives the train of cups C and feeds it accurately into the center space between a set of feed rollers in a feed roller mechanism 16. The feed roller mechanism 16 comprises a set of rollers, each mounted for powered rotation, and arranged about the center line of a circular space defined by the feed roller outer perimeters, to engage the rims of the cups C and to rotate the same. The rollers 16 are adjustably tilted out of the plane of the circular space to also feed the cups at an accurately predetermined feed rate through an oven 18. The exposed cup rims are heated in the oven 18 to be softened in preparation to being formed by helical grooves g formed into the outer surface of each of the curling screws 36 (FIG. 2) included in the curling screw mechanism 20. The cup train is supported on guide rods 22 while in the lip rolling machine 10 to be accurately guided into the feed roller mechanism 16 and curling screw mechanism 20.

The helical grooves g in the curling screws 36 are of a particular geometry which act on the cup rims to progressively curl or roll a lip as each cup is driven between the curling screws 36 by the rotation of the curling screws and the engagement with the helical grooves. The length of the curling screws 36 and the temperature at which they are maintained are designed to carry out the lip rolling process and to insure that the formed lip does not spring out after the cup exits the curling screws. The design principles involved are well known in the art, and do not comprise a part of the present invention, and hence, a detailed description is not here set out.

The rods 22 may also be adjustable to each container size. The feed rollers in the mechanism 16 are rotated by a belt drive (described below) to cause the cup stack to be rotating as it enters the curling screw mechanism 20.

The feed rate induced by the mechanism 16 is adjustable to be closely matched to the speed of operation of the curling screw mechanism 20, as described above. In addition, the diameter of the circular space around which the feed rollers are arranged must be adjustable if the machine 10 is to be used for variously sized cups. An improved adjustable feed roller mechanism is described in U.S. Ser. No. 09/203,897 filed on Dec. 2, 1998, attorney docket BON-111.

The present invention has to do with an improved adjustable curling screw mechanism 20 in which all of the curling screws are simultaneously adjustable quickly and easily to be matched to different container types. These adjustments may be made "on the fly", i.e., when the machine is running, in order to more easily determine if a proper adjustment has been accomplished, and to eliminate the need to interrupt production in order to make adjustments.

Figure 2:
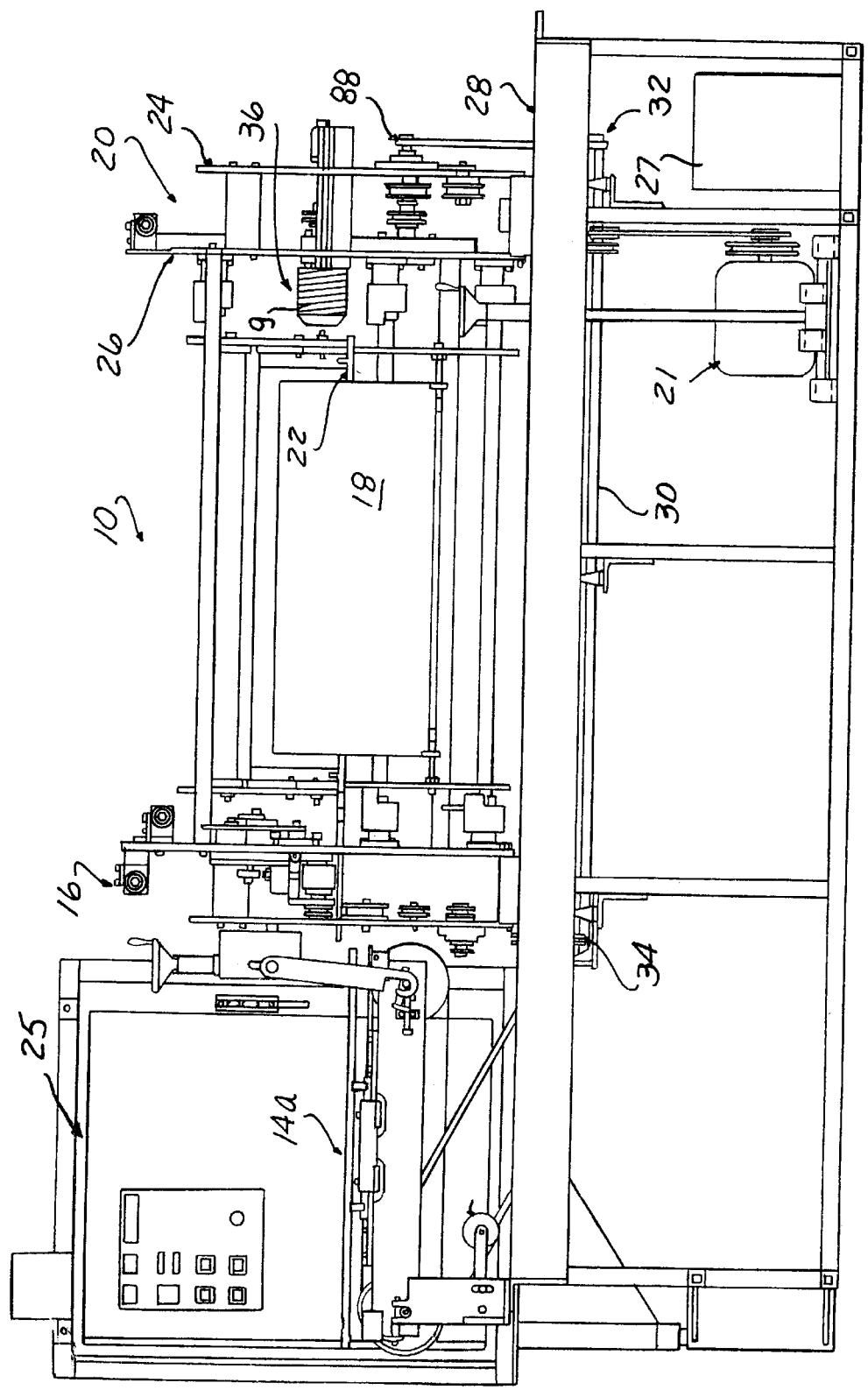
FIG. 2 is a front elevational view of a lip rolling machine incorporating an adjustable curling screw mechanism according to the invention.

FIG. 2 shows a lip curling machine 10 incorporating the adjustable curling screw mechanism 20 according to the present invention, mounted to an end plate 24 and a main plate 26, which are joined together and detachably bolted to a machine base 28. Oven 18 and a lip curling screw mechanism 20 are separately and detachably mounted to the base 28.

The particular design of the oven shown includes a capability for a tilt back of the oven 18 as well as for complete removal, quickly and easily. The feed roller mechanism 16 also may have a simultaneous adjustment capability. These improved designs are not required for use of the present invention, as the improved curling screw mechanism 20 may be used with various other oven and feed roller mechanism designs. However, an improved form of each of these components is described in copending applications U.S. Ser. No. 09/203,897 filed on Dec. 2, 1998, attorney docket no. BON-111 and U.S. Ser. No. 09/203,912 filed on Dec. 2, 1998, attorney docket no. BON-111-2. An improved transition conveyor 14A and guide rod adjustment arrangement are also described in U.S. Ser. No. 09/203,912 filed on Dec. 2, 1998, attorney docket no. BON-112-2.

A control panel 25 is also shown. Coolant piping connections to the curling screw mechanism 20 are omitted in this view for clarity. A temperature control unit 27 either activates a heater (not shown) or introduces cool water in order to maintain the temperature of the curling screws and guide rods in a proper range. Such units are commercially available, and a suitable unit is Model TNY4 from ACE (Applied Engineering Co.).

Figure 3:
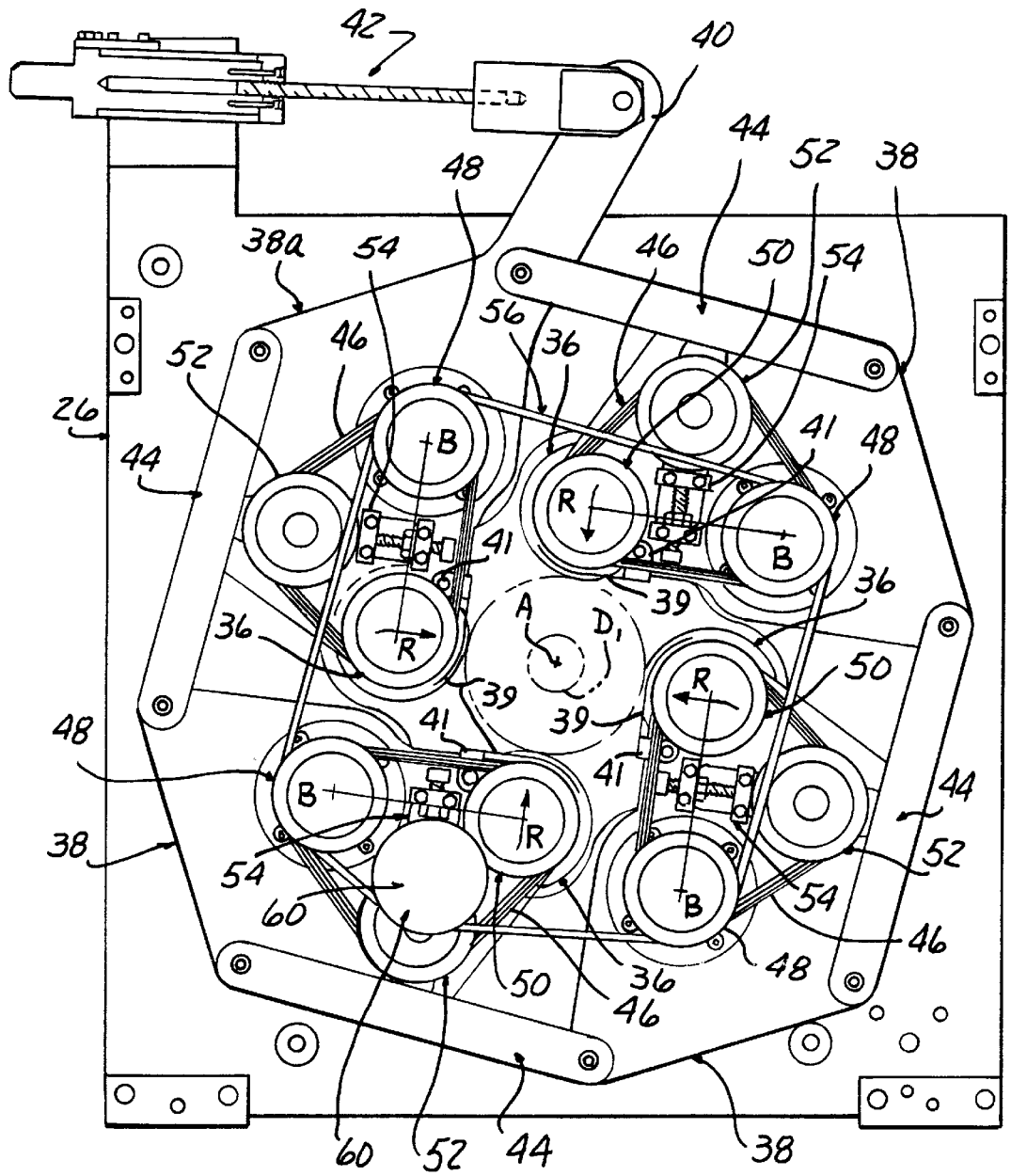
FIG. 3 is an inside end elevational view of the adjustable curling screw mechanism.

FIG. 3 is an inside end view of the curling screw mechanism 20. The design shown is for an array of four curling screws 36 (FIG. 7) arranged in opposing pairs about a common axis or center "A" of a circular space, shown in phantom and corresponding to the outside rim diameter of the container to be formed.

Each curling screw 36 is rotatably mounted on a respective one of a series of mounting plates 38 supported on fixed plate 26 for pivoting about pivot axes "B". The plates 38 are caused to be pivoted by an arm 40 projecting from one of the mounting plate 38A and moved by an adjuster 42. A linkage system comprised of a series of links 44 connecting the mounting plates 38 together at points outboard from the pivot axes B constrains all of the mounting plates 38 to pivot in unison with each other.

Figure 4:
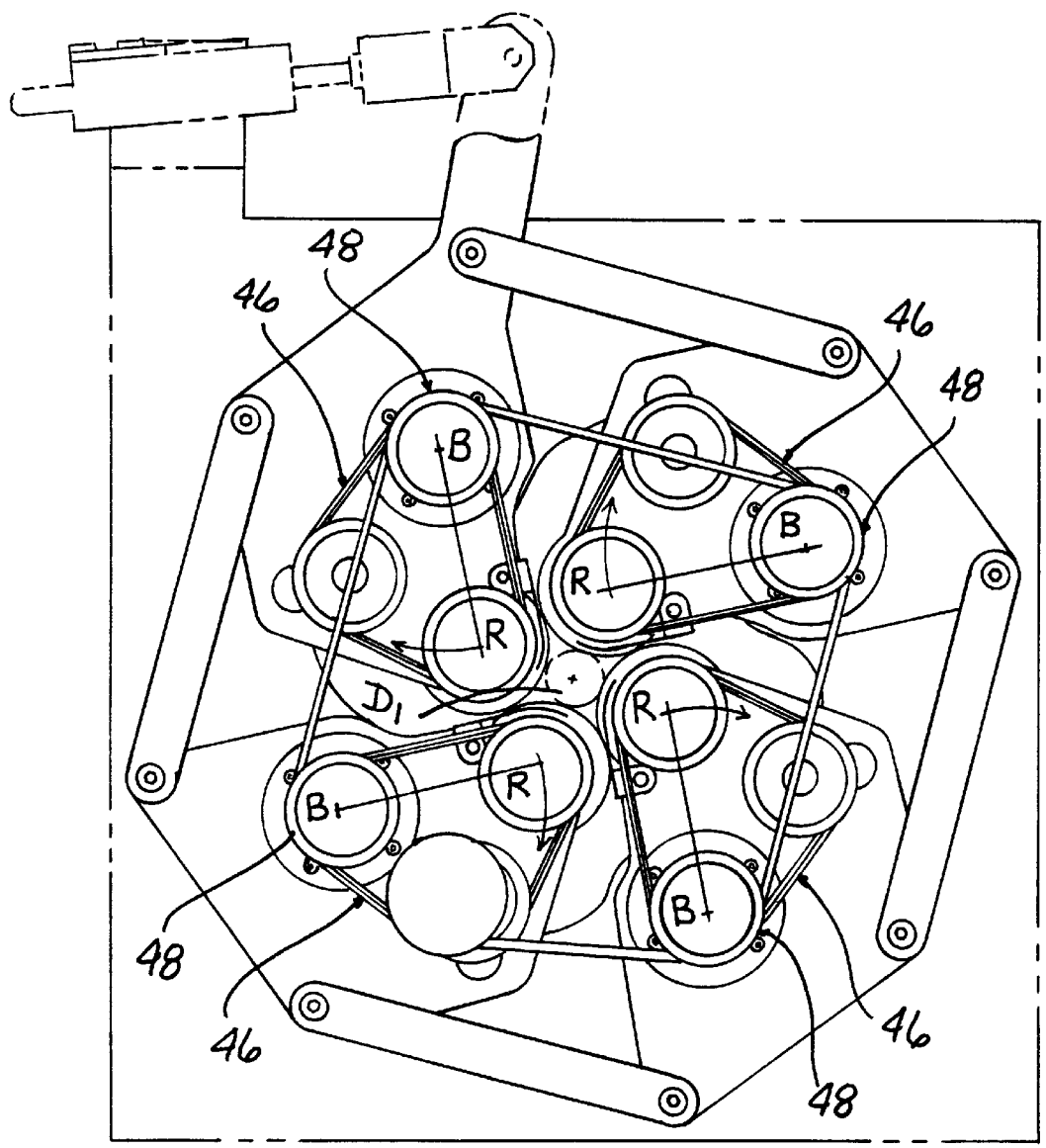
FIG. 4 is a simplified end view of the main curling screw components shown in FIG. 3 showing a different adjusted condition.

The location of the pivot axes B, centerline A and link connection are selected so that an equal changes in radius of the circumscribed circular space of each curling screw 36 occur during pivoting movement of the plates 38 swinging the curling screws 36 about radii R to adjust the spacing circle diameter through a range from $D_1$ to $D_2$ (FIG. 4). This insures that the location of the axis A remains in the same exact location as adjustments are made.

The mounting plates 38 also carried sheet metal guides 39 attached with clips 41 (FIGS. 3, 4), which guides 39 project out of the space between the curling screws 36 to insure that cups driven out from the screws clear the machine and enter a collecting arrangement (not shown).

Individual timing drive belts 46 are driven by individual drive pulleys 48 mounted aligned on pivot axes B, timing belts 46 extending around individual pulleys 50 driving a respective curling screw 36, and idler pulleys 52 engaged with belt tension adjusters 54.

The individual drive pulleys 48 in turn are driven by a common main drive belt 56 circulated around the outer perimeter of each of drive pulleys 58 (FIG. 5) fixed on common shafts with the drive pulleys 48 to be aligned therewith. The common main drive belt 56 is tensioned by an idler 60 adjustable on fixed plate 24 by a mounting bolt 62 and arm 64 (FIG. 5) bolt 62 passing through slot 65 in plate 24. A shoulder bolt 61 pivotally supports the arm 64 at one end, and a nut 63 on a stud extending through a slot 67 secures an adjusted position (FIG. 6).

Figure 5:
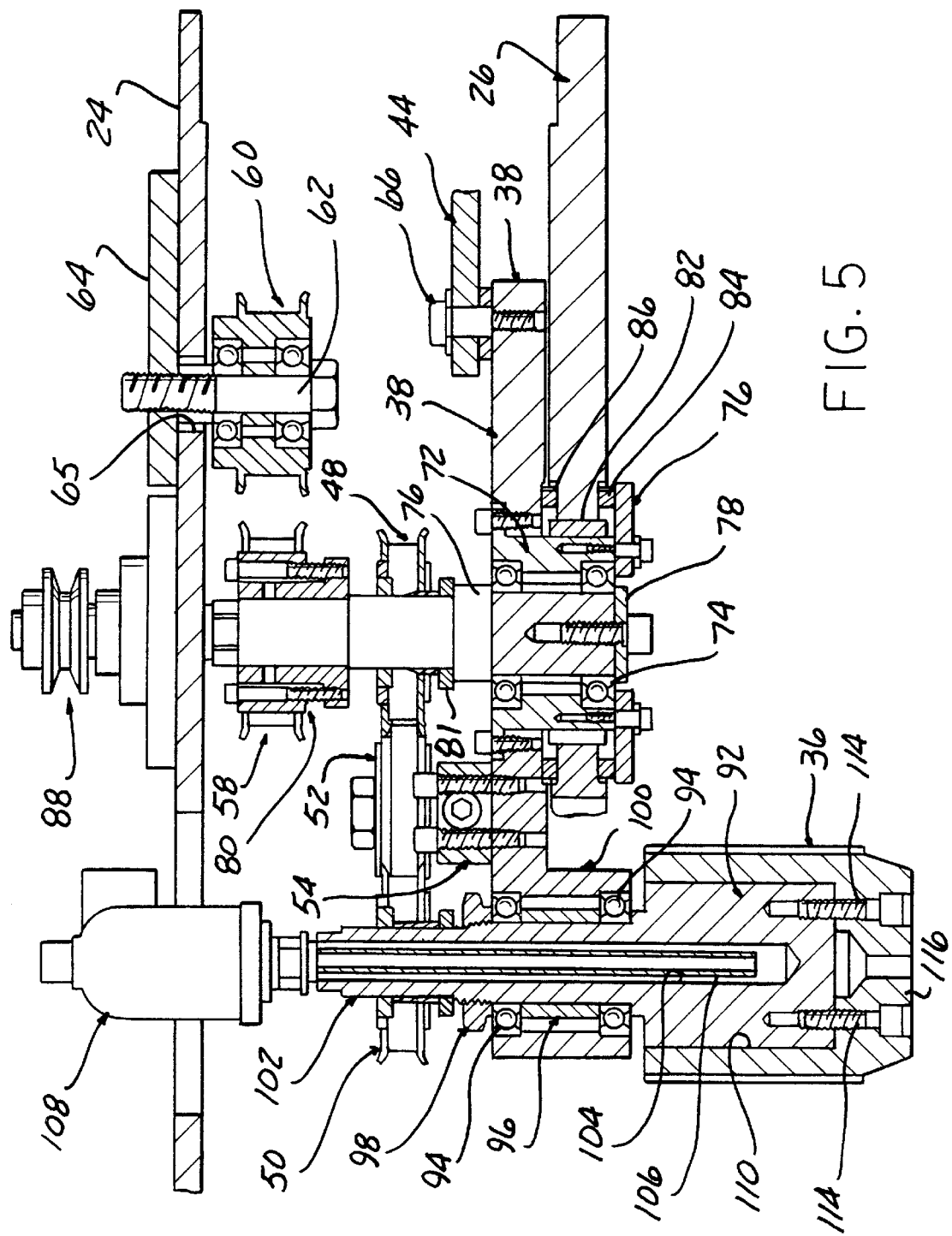
FIG. 5 is an enlarged plan view in partial section of the curling screw mechanism shown in FIGS. 3 and 4.
Figure 6:
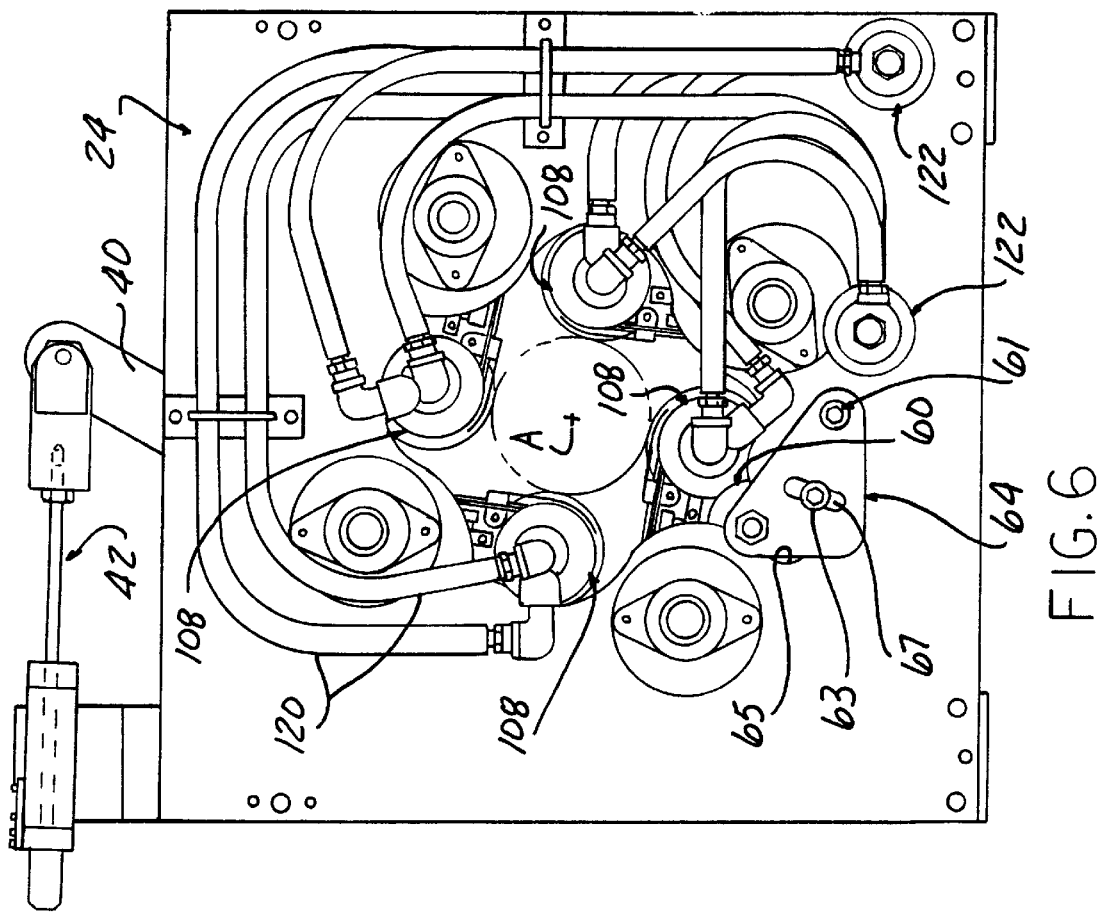
FIG. 6 is an outside end elevational view of the adjustable curling screw mechanism, showing the coolant supply connections.

FIG. 5 shows the details of the above components. The links 44 are pivotally connected to the respective mounting plates 38 by shoulder bolts 66 received in threaded bore in the plates 38, spring washer 68 and spacer washer 70 providing thrust bearing action. An adapter 72 is secured in each of the mounting plate, housing a ball bearing 74 held on one end of shaft 76 with retainer 76 and end cup 78, secured with screws and shoulder bolts.

The shaft 76 to which pulleys 58 and 48 are fixed with cone wedges 80, 82 rotates within the bearing 74. A bushing 82 and thrust washers 84, 86 support the mounting plate 38 for pivoting and the fixed plate 26.

A main drive pulley 88 is affixed to an extension of shaft 76 for one of the drive pulleys 48, driven by belt 90 and pulley 32 (FIG. 2) on shaft 30.

The curling screws 36 are mounted on a 7075 aluminum arbor 92, rotatably supported on a respective mounting plate 38 by bearing 94, held against spacer 96 with a nut 98, all housed in a boss 100 projecting from the inside end of each plate 38. Each arbor 92 has one of the pulleys 50 affixed to a stem portion 102.

The arbors 92 each have a lengthwise coolant bore 104 formed therein with a stainless steel tube 106 received in the bore, extending to a point adjacent the end of the bore 104. This arrangement defines a coolant flow path, with fluid flowing in the annular space around the tube 106 and returning within the tube 106.

A rotary union 108 provides a connection to coolant supply and return conduits (described below).

The curling screws 36 comprise a closed end cylinder having an internal bore 110 received over the large diameter portion 112 of arbor 92.

Machine screws 114 extending through the end wall 116 of curling screw 36 fix the curling screw 36 to the arbor 92.

The curling screws 36 are constructed of 303 stainless steel and is fit to the larger diameter portion 110 of the arbor 92 with a slight clearance (0.002 inches) at room temperature. Since aluminum has a larger coefficient of thermal expansion than steel, the arbor 92 will expand to a greater degree than the curling screws 36 as the temperature rises. The designed for operating temperature is approximately 180° F., and at this temperature an interference fit exists.

Thus, good thermal contact is established promoting conductive heat transfer into the arbor 92 from the curling screws 36 which are heated by contact with the cup rims during forming. Since aluminum is highly conductive of heat, adequate cooling is achieved without direct contact between the coolant fluid (water) and the curling screws 36. Thus, the curling screws 36 can be removed without release of any coolant.

Figure 7:
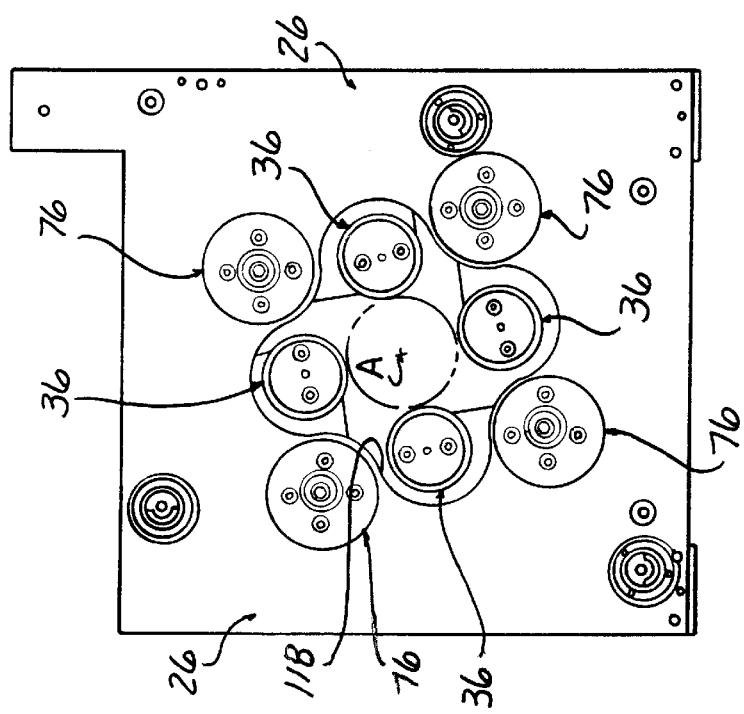
FIG. 7 is an end view of a main plate showing portions of certain curling screw mechanism components.

The curling screws 36 project through an opening 118 in fixed plate 26 to a point adjacent the exit ends of the guide rods 22 to receive the horizontal stack of nested containers (FIGS. 7, 2).

Supply and return coolant lines 120 extend from manifolds to each rotary union 108 (FIG. 6). The temperature controller 27 controls flow of coolant, and any heating or cooling thereof to maintain a 180° F. temperature to prevent overheating or overcooling of the plastic cups as they are driven by the feed screws 36.

Figure 9:
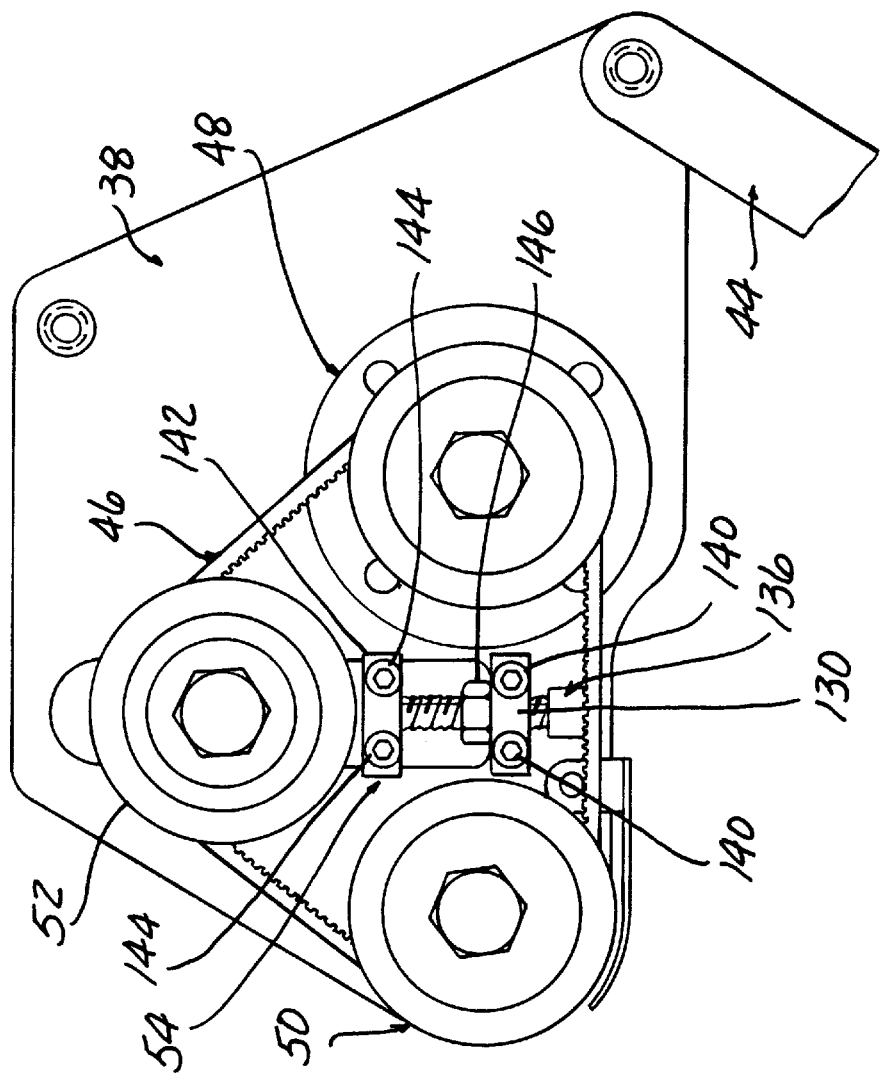
FIG. 9 is an enlarged sectional view of a representative pivotal mounting plate depicting the idler tensioner components.
Figure 8:
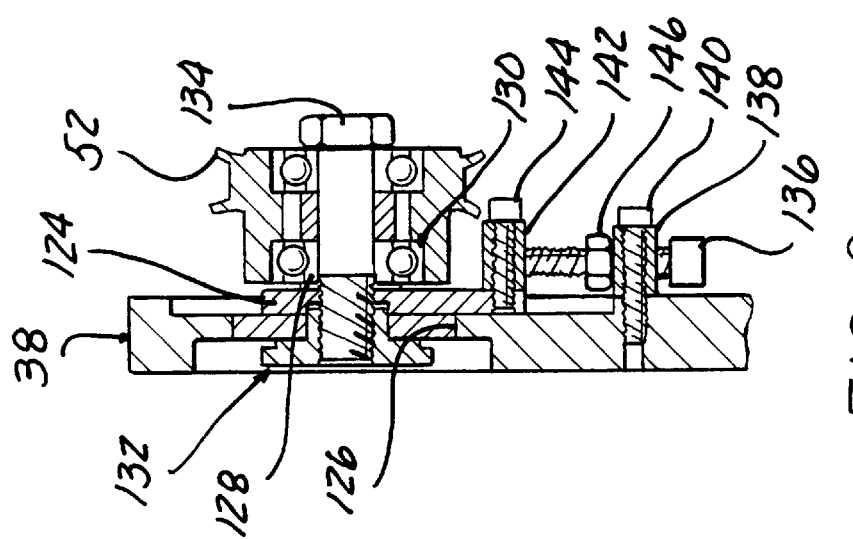
FIG. 8 is an enlarged end view of a representative pivotal mounting plate showing the idler tensioner components.
Figure 10:
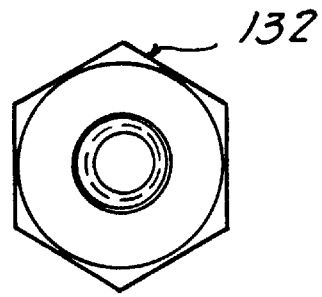
FIG. 10 is an end view of a clamping nut shown in FIG. 8.

FIGS. 8–10 show details of the idler tensioners 54 acting on the idler pulleys which are rotatably mounted on bolt 122.

A rectangular slider plate 124 overlies a slot 126 in the mounting plate 38 with a shim washer 128 interposed ahead of the pulley bearing 130. A locking nut 132 engages the slider plate 124 and receives the threaded end of the pulley axle bolt 134.

A pusher screw 136 is threaded through a bore in a bracket 138 held with screws 140. The end of the screw 136 bears against a bracket 142 attached to the slider plate 124 with screws 144. A jam nut 146 secures an adjusted position.

Figure 11:
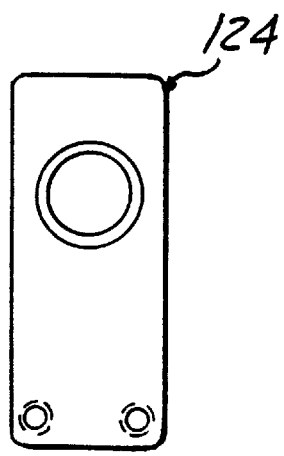
FIG. 11 is a plan view of a slider plate shown in FIG. 3.
Figure 12:
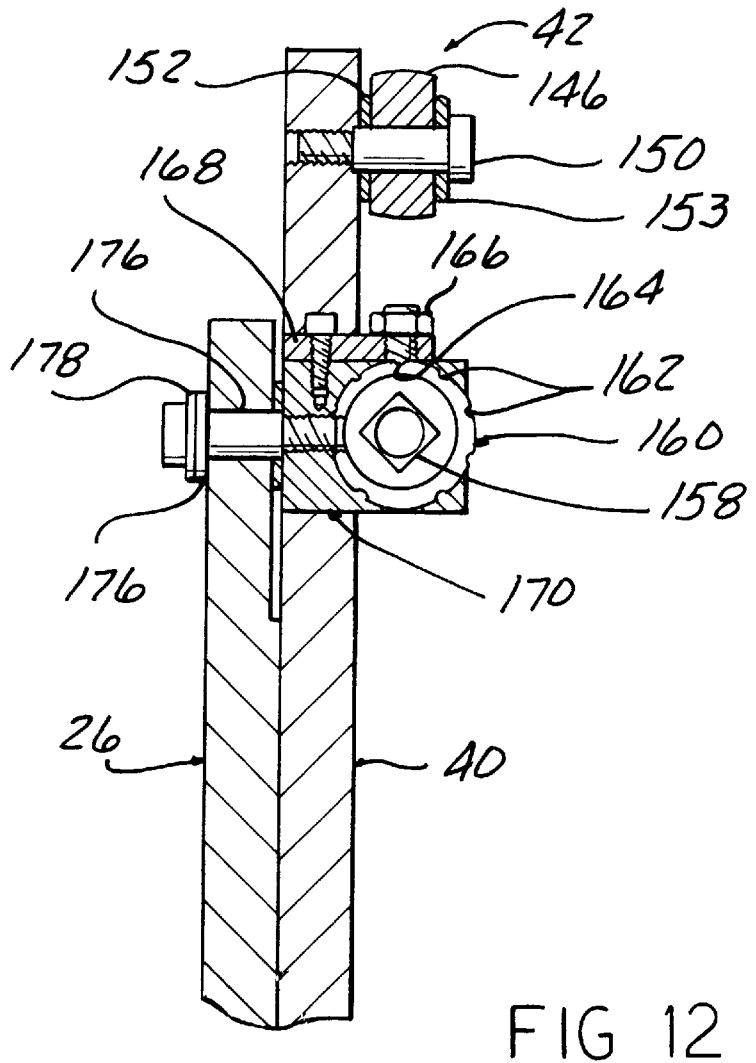
FIG. 12 is a partially sectional end view of the adjuster shown in FIG. 3 with fragmentary portions of connected structures.

FIGS. 11–13 show further details of the adjuster 42, which includes a threaded rod 44 with an end piece 146 attached by one end being threaded into a bore therein, secured with a locking nut 148.

The end piece 146 is pivotally connected to arm 40 by a shoulder bolt 150 and washers 153.

The other end of the rod 44 is also threaded and received in a clearance bore 152 in a rotary cylinder 54, threadedly engaged by an end cap 156 attached to the end of the cylinder 154. A square end feature 158 formed on the cylinder 154 allows a crank handle to be used to rotate the cylinder 154 to make adjustments by advancing or retracting the threaded rod 144 to cause the arm 40 to be moved in either direction.

A flange 160 has a series of milled grooves or pockets 162 engaged by a spring loaded ball 164 in the end of a stud 166 threaded into a holder plate 168 fastened to a housing 170 such that detents are provided for equal advances of the rotary cylinder in either direction.

The housing 170 is pivotally secured to the fixed main plate 26 by a shoulder bolt 176 and spring washers 178 changing angles occurring as the rod is shifted in either direction.

FIG. 14 shows an extended adjustment for a large diameter container.

A pair of opposing radial faces 172, 174 are defined by the end cap 156 and end piece 146, the distances $d_1$, $d_2$ therebetween which may be measured as with calipers to obtain a measurement corresponding to each adjusted condition. These adjustments can thus be recorded and reset in making a future set up for each product.

The above described embodiment allows very rapid, convenient adjustments without affecting the centerline location, which can be carried out with the machine running. Four curling screws can be used without an additional burden in making set ups.

Disassembly of the curling screws themselves is made easier by eliminating coolant spillage inherent in the previous design.

Accordingly, the above recited objects of the present invention have been achieved.

What is claimed is:

1. An adjustable curling screw mechanism for a lip rolling machine adapted to form a rolled lip on the rim of a container by means of said curling screw mechanism, said curling screw mechanism comprising:

a plurality of curling screws arranged about a circular space about a center axis, each curling screw rotated to carry out said forming, each curling screw formed with a helical groove engaging said container rim and progressively forming a lip as said container is axially advanced between said curling screws by rotation thereof;

a mounting for each curling screw for enabling selective adjusting movement causing a selective increase or decrease of the radius of said spacing circle to enable adaptation to different sized containers;

said mounting including means for constraining simultaneous radial adjusting movement of said curling screws together while maintaining the location of said center axis of said spacing circle; and a selectively operable adjuster acting on all of said curling screws simultaneously to cause said simultaneous movement.

2. The curling screw mechanism according to claim 1 wherein said curling screw mounting comprises a series of pivoted mounting plates each carrying a respective curling screw, said series of mounting plates linked together by a linkage system to pivot in unison with each other.

3. The curling screw mechanism according to claim 2 wherein said pivotal mounting plates pivot about points located to produce equal increments of radial motion with respect to said spacing circle center axis, whereby all of said curling screws move radially in equal increments.

4. The curling screw mechanism according to claim 3 wherein each of said curling screws is rotated by a separate individual drive pulley rotatably mounted on each mounting plate spaced from the respective curling screw drive and an individual belt extending to form said individual drive pulley to a pulley connected to said respective curling screw; and a common drive belt extending around all of said individual drive pulleys and in engagement therewith.

5. The curling screw mechanism according to claim 4 wherein said mounting plate pivot locations are each coaxial with said individual drive pulley axes whereby said adjustment movement does not affect said common drive belt.

6. The curling screw mechanism according to claim 2 wherein said adjuster includes a threaded rod mounted for lengthwise threaded adjustment, and a driving connection between said threaded rod and said linkage system so as to cause pivoting movement of all of said mounting plates with advance of or retraction of said threaded rod.

7. The curling screw mechanism according to claim 6 wherein said adjuster further includes opposing radial surfaces spaced in correspondence to a given adjustment of said threaded rod to enable resetting a given adjustment by measurement of the distance between said faces at a given adjustment.

8. The curling screw mechanism according to claim 1 wherein four curling screws are included, arranged in opposing pairs.

9. The curling screw mechanism according to claim 4 wherein each mounting plate includes an idler pulley engaged by a respective individual drive belt, and a tensioner for such idler pulley for setting tension in said respective individual drive belt.

10. The curling screw mechanism according to claim 4 wherein each individual drive belt and said common drive belt are time belts maintaining synchronism between each curling screw.

11. A method of adjusting the spacing of a plurality of curling screws in a lip rolling machine, comprising the steps of:

mounting each curling screw on a series of separate pivoted mounting plates arranged about a spacing center axis, with the pivots located to carry said curling screws radially in or out;

linking each pivoted mounting plate to other adjacent mounting plates so that all pivot in unison;

adjusting the pivotal position of one of said mounting plates so that all of said curling screws are moved radially to a desired spacing.

12. The method according to claim 11 further includes the step of driving each of said curling screws with a separate individual drive pulley carried by each mounting plate each driven by a common drive belt, said pivot location aligned with an axis of rotation of each a respective individual drive pulley, whereby said adjustments do not affect said common drive belt.

* * * * *